US011019300B1

United States Patent
Baxendale et al.

(10) Patent No.: US 11,019,300 B1
(45) Date of Patent: May 25, 2021

(54) PROVIDING SOUNDTRACK INFORMATION DURING PLAYBACK OF VIDEO CONTENT

(71) Applicant: Amazon Technologies, Inc., Reno, NV (US)

(72) Inventors: Michelle Dianne Baxendale, London (GB); Ike Eshiokwu, Seattle, WA (US); Ian Fuller, London (GB); Sam Ahmed Akil Hassan, London (GB); Salmen Hichri, London (GB); Lucy Jane Spence, London (GB); Alexandre Paul Collin, Sartrouville (FR)

(73) Assignee: Amazon Technologies, Inc., Reno, NV (US)

( * ) Notice: Subject to any disclaimer, the term of this patent is extended or adjusted under 35 U.S.C. 154(b) by 1462 days.

(21) Appl. No.: 13/927,970

(22) Filed: Jun. 26, 2013

(51) Int. Cl.
*H04N 5/445* (2011.01)

(52) U.S. Cl.
CPC .................................. *H04N 5/445* (2013.01)

(58) Field of Classification Search
CPC ...................................................... G06Q 30/06
USPC ............................................... 705/26.1–27.2
See application file for complete search history.

(56) References Cited

U.S. PATENT DOCUMENTS

| 5,260,556 | A | 11/1993 | Lake et al. |
| 5,556,722 | A | 9/1996 | Narukawa et al. |
| 5,596,705 | A | 1/1997 | Reimer et al. |
| 5,691,527 | A | 11/1997 | Hara et al. |
| 5,692,212 | A | 11/1997 | Roach |
| 5,781,730 | A | 7/1998 | Reimer et al. |
| 6,065,042 | A | 5/2000 | Reimer et al. |
| 7,103,541 | B2 | 9/2006 | Attias et al. |
| 7,293,275 | B1 | 11/2007 | Krieger et al. |
| 7,444,593 | B1 | 10/2008 | Reid |
| 7,558,865 | B2 | 7/2009 | Lin et al. |
| 7,774,075 | B2 | 8/2010 | Lin |
| 7,814,521 | B2 | 10/2010 | Ou et al. |

(Continued)

FOREIGN PATENT DOCUMENTS

| EP | 1993282 | 11/2008 |
| EP | 2071578 | 6/2009 |

(Continued)

OTHER PUBLICATIONS

Mearian, L. (2002). Visa eyes voice recognition for online purchases. Computerworld, 36(45), 22. Retrieved from https://search.proquest.com/trade-journals/visa-eyes-voice-recognition-online-purchases/docview/216092675/se-2?accountid=14753.*

(Continued)

*Primary Examiner* — Jeffrey A. Smith
*Assistant Examiner* — Jennifer V Lee
(74) *Attorney, Agent, or Firm* — Thomas | Horstemeyer, LLP

(57) ABSTRACT

Disclosed are various embodiments for providing soundtrack information during the playback of video content. A video content item is rendered upon a display. A command is received from a user. In response to this command, a current time in the playback of the video content item is determined. Further, an item associated with the current time in the playback is identified. The item is featured in corresponding video or audio content of the video content item at the current time when the command is received. An information user interface is rendered upon the display to provide information regarding the identified item.

20 Claims, 4 Drawing Sheets

(56) References Cited

U.S. PATENT DOCUMENTS

| | | | |
|---|---|---|---|
| 7,840,691 B1 * | 11/2010 | De Bonet | G06Q 30/02 709/231 |
| 8,161,082 B2 | 4/2012 | Israel et al. | |
| 8,209,396 B1 | 6/2012 | Raman et al. | |
| 8,250,605 B2 | 8/2012 | Opaluch | |
| 8,365,235 B2 | 1/2013 | Hunt et al. | |
| 8,510,775 B2 | 8/2013 | Lafreniere et al. | |
| 8,510,779 B2 | 8/2013 | Slothouber et al. | |
| 8,552,983 B2 | 10/2013 | Chiu | |
| 8,644,702 B1 | 2/2014 | Kalajan | |
| 8,689,255 B1 | 4/2014 | Gregov et al. | |
| 8,763,041 B2 | 6/2014 | Timmermann et al. | |
| 8,849,943 B2 | 9/2014 | Huang et al. | |
| 8,955,021 B1 | 2/2015 | Treder et al. | |
| 9,078,030 B2 | 7/2015 | Kuo | |
| 9,113,128 B1 | 8/2015 | Aliverti et al. | |
| 9,241,187 B2 | 1/2016 | Ricci | |
| 9,491,033 B1 | 11/2016 | Soyannwo et al. | |
| 2002/0022959 A1 | 2/2002 | Nakamura et al. | |
| 2002/0042920 A1 | 4/2002 | Thomas et al. | |
| 2002/0059610 A1 | 5/2002 | Ellis | |
| 2003/0050863 A1 | 3/2003 | Radwin | |
| 2004/0028258 A1 | 2/2004 | Naimark et al. | |
| 2004/0056097 A1 | 3/2004 | Walmsley et al. | |
| 2004/0133919 A1 | 7/2004 | Incentis | |
| 2004/0197088 A1 | 10/2004 | Ferman et al. | |
| 2005/0160465 A1 | 7/2005 | Walker | |
| 2005/0177538 A1 | 8/2005 | Shimizu et al. | |
| 2005/0264527 A1 | 12/2005 | Lin | |
| 2006/0007452 A1 | 1/2006 | Gaspard et al. | |
| 2006/0015818 A1 | 1/2006 | Chaudhri et al. | |
| 2006/0184538 A1 | 8/2006 | Randall et al. | |
| 2006/0271836 A1 | 11/2006 | Morford et al. | |
| 2006/0278722 A1 | 12/2006 | Tominaga | |
| 2007/0003223 A1 | 1/2007 | Armstrong et al. | |
| 2007/0061724 A1 | 3/2007 | Slothouber et al. | |
| 2007/0124756 A1 | 5/2007 | Covell et al. | |
| 2007/0143737 A1 | 6/2007 | Huang et al. | |
| 2007/0165022 A1 | 7/2007 | Peleg et al. | |
| 2007/0250901 A1 | 10/2007 | McIntire et al. | |
| 2008/0002021 A1 | 1/2008 | Guo et al. | |
| 2008/0005222 A1 | 1/2008 | Lambert et al. | |
| 2008/0066135 A1 | 3/2008 | Brodersen et al. | |
| 2008/0172293 A1 | 7/2008 | Raskin et al. | |
| 2008/0196072 A1 | 8/2008 | Chun | |
| 2008/0209465 A1 | 8/2008 | Thomas et al. | |
| 2008/0235749 A1 | 9/2008 | Jain et al. | |
| 2009/0018898 A1 * | 1/2009 | Genen | G06Q 30/0601 705/26.7 |
| 2009/0019009 A1 | 1/2009 | Byers | |
| 2009/0081950 A1 | 3/2009 | Matsubara et al. | |
| 2009/0089186 A1 | 4/2009 | Paolini | |
| 2009/0090786 A1 | 4/2009 | Hovis | |
| 2009/0094113 A1 | 4/2009 | Berry et al. | |
| 2009/0138906 A1 | 5/2009 | Eide et al. | |
| 2009/0199098 A1 | 8/2009 | Kweon et al. | |
| 2009/0228919 A1 | 9/2009 | Zott et al. | |
| 2010/0057782 A1 | 3/2010 | McGowan et al. | |
| 2010/0092079 A1 | 4/2010 | Aller | |
| 2010/0103106 A1 | 4/2010 | Chiu | |
| 2010/0153831 A1 | 6/2010 | Beaton | |
| 2010/0154007 A1 * | 6/2010 | Touboul | G06Q 30/02 725/60 |
| 2010/0199219 A1 | 8/2010 | Poniatowski et al. | |
| 2010/0222102 A1 | 9/2010 | Rodriguez | |
| 2010/0251292 A1 | 9/2010 | Srinivasan et al. | |
| 2010/0287053 A1 | 11/2010 | Ganong et al. | |
| 2010/0287592 A1 | 11/2010 | Patten et al. | |
| 2010/0312547 A1 * | 12/2010 | Van Os | G10L 15/26 704/9 |
| 2010/0312596 A1 | 12/2010 | Saffari et al. | |
| 2011/0023073 A1 | 1/2011 | McCarthy et al. | |
| 2011/0047299 A1 | 2/2011 | Yu et al. | |
| 2011/0049250 A1 | 3/2011 | Hovis et al. | |
| 2011/0067061 A1 | 3/2011 | Karaoguz et al. | |
| 2011/0083111 A1 | 4/2011 | Forutanpour et al. | |
| 2011/0131520 A1 | 6/2011 | Al-Shaykh et al. | |
| 2011/0154405 A1 | 6/2011 | Isaias | |
| 2011/0162007 A1 | 6/2011 | Karaoguz et al. | |
| 2011/0167456 A1 | 7/2011 | Kokenos et al. | |
| 2011/0181780 A1 | 7/2011 | Barton | |
| 2011/0246295 A1 | 10/2011 | Kejariwal et al. | |
| 2011/0246495 A1 | 10/2011 | Mallinson | |
| 2011/0270923 A1 | 11/2011 | Jones et al. | |
| 2011/0282906 A1 | 11/2011 | Wong | |
| 2011/0289534 A1 | 11/2011 | Jordan et al. | |
| 2011/0296465 A1 | 12/2011 | Krishnan et al. | |
| 2012/0014663 A1 | 1/2012 | Knight et al. | |
| 2012/0033140 A1 | 2/2012 | Xu | |
| 2012/0054615 A1 | 3/2012 | Lin et al. | |
| 2012/0072953 A1 | 3/2012 | James et al. | |
| 2012/0096499 A1 | 4/2012 | Dasher et al. | |
| 2012/0151530 A1 | 6/2012 | Krieger et al. | |
| 2012/0210205 A1 | 8/2012 | Sherwood et al. | |
| 2012/0220223 A1 | 8/2012 | Rose et al. | |
| 2012/0238363 A1 | 9/2012 | Watanabe et al. | |
| 2012/0240161 A1 | 9/2012 | Kuo | |
| 2012/0256000 A1 | 10/2012 | Cok | |
| 2012/0256007 A1 | 10/2012 | Cok | |
| 2012/0257766 A1 * | 10/2012 | Seymour | G11B 19/02 381/86 |
| 2012/0308202 A1 | 12/2012 | Murata et al. | |
| 2013/0014155 A1 | 1/2013 | Clarke et al. | |
| 2013/0021535 A1 | 1/2013 | Kim et al. | |
| 2013/0024783 A1 | 1/2013 | Brakensiek et al. | |
| 2013/0057543 A1 | 3/2013 | Mann et al. | |
| 2013/0060660 A1 | 3/2013 | Maskatia et al. | |
| 2013/0074125 A1 | 3/2013 | Hao et al. | |
| 2013/0094013 A1 | 4/2013 | Hovis et al. | |
| 2013/0110672 A1 | 5/2013 | Yang et al. | |
| 2013/0113830 A1 | 5/2013 | Suzuki | |
| 2013/0113993 A1 | 5/2013 | Dagit, III | |
| 2013/0115974 A1 | 5/2013 | Lee et al. | |
| 2013/0144727 A1 * | 6/2013 | Morot-Gaudry | G06Q 30/02 705/14.72 |
| 2013/0219434 A1 | 8/2013 | Farrell et al. | |
| 2013/0266292 A1 | 10/2013 | Sandrew et al. | |
| 2013/0291018 A1 | 10/2013 | Billings et al. | |
| 2014/0035726 A1 | 2/2014 | Schoner et al. | |
| 2014/0035913 A1 | 2/2014 | Higgins et al. | |
| 2014/0043332 A1 | 2/2014 | Rollett | |
| 2014/0068670 A1 | 3/2014 | Timmermann et al. | |
| 2014/0122564 A1 * | 5/2014 | Arora | H04L 65/4084 709/203 |
| 2014/0130102 A1 | 5/2014 | Iijima et al. | |
| 2014/0134947 A1 | 5/2014 | Stouder-Studenmund | |
| 2014/0152894 A1 | 6/2014 | Childs et al. | |
| 2014/0208355 A1 | 6/2014 | Gregov et al. | |
| 2014/0281985 A1 | 9/2014 | Garrison et al. | |
| 2015/0095774 A1 | 4/2015 | Bates et al. | |
| 2015/0156562 A1 | 6/2015 | Treder et al. | |
| 2015/0193069 A1 | 7/2015 | Di et al. | |
| 2015/0195474 A1 | 7/2015 | Lu | |
| 2015/0235672 A1 | 8/2015 | Cudak et al. | |
| 2015/0339508 A1 | 11/2015 | Hosokane | |
| 2015/0357001 A1 | 12/2015 | Aliverti et al. | |

FOREIGN PATENT DOCUMENTS

| | | |
|---|---|---|
| WO | 2003084229 | 10/2003 |
| WO | 2014036413 | 3/2014 |

OTHER PUBLICATIONS

U.S. Appl. No. 14/034,055 entitled "Playback of Content Using Multiple Devices" filed Sep. 23, 2013.

U.S. Appl. No. 13/778,846 entitled "Shopping Experience Using Multiple Computing Devices" filed Feb. 27, 2013.

International Searching Authority and Written Opinion dated Mar. 21, 2014 for PCT/US2013/057543 filed Aug. 30, 2013.

"Sony Pictures to smarten up Blu-ray with MovieIQ, the 'killer app for BD-Live,'" Engadget, retrieved from http://www.engadget.com/

(56) References Cited

OTHER PUBLICATIONS

2009/06/18/sony-pictures-to-smarten-up-blu-ray-with-movieiq-the-killer-ap/, Jun. 18, 2009.
"Hulu 'Face Match' feature attaches an actor's entire history to their mug," Engadget, retrieved from http://www.engadget.com/2011/12/08/hulu-face-match-feature-attaches-an-actors-entire-history-to/, Dec. 8, 2011.
"TVPlus for the iPad," iTunes Store, retrieved from "http://itunes.apple.com/us/app/tvplus/id444774882?mt=B," updated Apr. 13, 2012.
"Wii U GamePad," Wii U Official Site—Features, retrieved from "http://www.nintendo.com/wiiu/features/," retrieved Dec. 4, 2012.
"Entertainment is more amazing with Xbox SmartGlass," Xbox SmartGlass 1 Companion Application—Xbox.com, retrieved from "http://www.xbox.com/en-US/smartglass," retrieved Dec. 4, 2012.
U.S. Appl. No. 13/601,210, filed Aug. 31, 2012 entitled "Providing Extrinsic Data For Video Content".
U.S. Appl. No. 13/601,235, filed Aug. 31, 2012 entitled "Timeline Interface For Video Content".
U.S. Appl. No. 13/601,267, filed Aug. 31, 2012 entitled "Enhancing Video Content With Extrinsic Data".
U.S. Appl. No. 13/227,097, filed Sep. 7, 2011 entitled "Synchronizing Video Content With Extrinsic Data".
U.S. Appl. No. 13/709,768, filed Dec. 10, 2012 entitled "Providing Content via Multiple Display Devices".
U.S. Appl. No. 13/709,768, filed Dec. 10, 2012, Non-Final Office Action dated Oct. 3, 2014.
U.S. Appl. No. 14/225,864, filed Mar. 26, 2014, Response to Final Office Action dated Jul. 13, 2015.
U.S. Appl. No. 14/225,864, filed Mar. 26, 2014, Final Office Action dated Jul. 13, 2015.
U.S. Appl. No. 14/225,864, filed Mar. 26, 2014, Response to Non-Final Office Action dated Mar. 3, 2015.
U.S. Appl. No. 14/225,864, filed Mar. 26, 2014, Non-Final Office Action dated Mar. 3, 2015.
U.S. Appl. No. 13/227,097, filed Sep. 7, 2011, Notice of Allowance dated Oct. 22, 2013.
U.S. Appl. No. 13/227,097, filed Sep. 7, 2011, Response to Non-Final Office Action dated Apr. 9, 2013.
U.S. Appl. No. 13/227,097, filed Sep. 7, 2011, Non-Final Office Action dated Apr. 9, 2013.
U.S. Appl. No. 14/826,508, filed Aug. 14, 2015, Response to Non-Final Office Action dated Oct. 26, 2016.
U.S. Appl. No. 14/826,508, filed Aug. 14, 2015, Non-Final Office Action dated Oct. 26, 2016.
U.S. Appl. No. 15/154,233, filed May 13, 2016, Non-Final Office Action dated Jun. 2, 2017.
U.S. Appl. No. 15/154,233, filed May 13, 2016, Response to Restriction/Election dated Feb. 3, 2017.
U.S. Appl. No. 15/154,233, filed May 13, 2016, Restriction/Election dated Feb. 3, 2017.
U.S. Appl. No. 14/218,408, filed Mar. 18, 2014, Response to Non-final Office Action dated Mar. 30, 2017.
U.S. Appl. No. 14/218,408, filed Mar. 18, 2014, Notice of Allowance dated Aug. 15, 2017.
U.S. Appl. No. 14/034,055, filed Sep. 23, 2013, Final Office Action dated Jul. 29, 2016.
U.S. Appl. No. 14/034,055, filed Sep. 23, 2013, Response to Final Office Action dated Jul. 29, 2016.
U.S. Appl. No. 14/493,970, filed Sep. 23, 2014, Final Office Action dated Feb. 10, 2017.
U.S. Appl. No. 14/493,970, filed Sep. 23, 2014, Response to Final Office Action dated Feb. 10, 2017.
U.S. Appl. No. 14/493,970, filed Sep. 23, 2014, Final Office Action dated Dec. 7, 2017.
U.S. Appl. No. 14/493,970, filed Sep. 23, 2014, Response to Non-Final Office Action dated Jun. 6, 2017.
U.S. Appl. No. 14/225,864, filed Mar. 26, 2014, Notice of Allowance dated Feb. 1, 2016.
U.S. Appl. No. 15/154,233, filed May 13, 2016, Response to Non-Final Office Action dated Jun. 2, 2017.
U.S. Appl. No. 15/154,233, filed May 13, 2016, Notice of Allowance dated Nov. 15, 2017.
U.S. Appl. No. 14/826,508, filed Aug. 14, 2015, Notice of Allowance dated Apr. 27, 2017.
U.S. Appl. No. 14/615,950, filed Feb. 6, 2015, Response to Final Office Action dated Dec. 1, 2016.
U.S. Appl. No. 14/615,950, filed Feb. 6, 2015, Non-Final Office Action dated May 5, 2017.
U.S. Appl. No. 14/615,950, filed Feb. 6, 2015, Response to Non-Final Office Action dated May 5, 2017.
U.S. Appl. No. 14/615,950, filed Feb. 6, 2015, Final Office Action dated Oct. 24, 2017.
U.S. Appl. No. 14/615,950, filed Feb. 6, 2015, Response to Final Office Action dated Oct. 24, 2017.
U.S. Appl. No. 14/615,950, filed Feb. 6, 2015, Notice of Allowance dated Mar. 15, 2018.
U.S. Appl. No. 15/164,070, filed May 25, 2016, Non-Final Office Action dated Feb. 7, 2018.
U.S. Appl. No. 13/778,846, filed Feb. 27, 2013, Response to Non-Final Office Action dated Jun. 5, 2017.
U.S. Appl. No. 13/778,846, filed Feb. 27, 2013, Final Office Action dated Dec. 15, 2017.
U.S. Appl. No. 13/778,846, filed Feb. 27, 2013, Response to Final Office Action dated Dec. 15, 2017.
Canadian Patent Application CA2,882,899 filed on Aug. 30, 2013, Determination of Allowance dated Nov. 9, 2017.
European Patent Application EP13832505.5 filed on Aug. 30, 2013, Office Action dated Jul. 10, 2017.
U.S. Appl. No. 15/792,217, filed Oct. 24, 2017, Non-Final Office Action dated Apr. 18, 2018.
U.S. Appl. No. 14/493,970, filed Sep. 23, 2014, Patent Board of Appeals Decision dated Apr. 18, 2018.
U.S. Appl. No. 13/778,846, filed Feb. 27, 2013, Non-Final Office Action dated Jun. 7, 2018.
Canadian Patent Application CA2, 882,899, Office Action dated Mar. 30, 2017.
Canadian Patent Application CA2, 882,899, Office Action dated Apr. 6, 2016.
European Patent Application EP13832505.5, Extended European Search Report dated Mar. 15, 2016.
SO/IEC 18004:2006. Information technology—Automatic identification and data capture techniques—QR Code 2005 bar code symbology specification. International Organization for Standardization, Geneva, Switzerland.
U.S. Appl. No. 14/493,970, filed Sep. 23, 2014, Non-Final Office Action dated Jun. 6, 2017.
U.S. Appl. No. 14/218,408, filed Mar. 18, 2014, Non-final Office Action dated Mar. 30, 2017.
U.S. Appl. No. 14/218,408, filed Mar. 18, 2014, Response to Final Office Action dated Nov. 25, 2016.
U.S. Appl. No. 14/218,408, filed Mar. 18, 2014, Final Office Action dated Nov. 25, 2016.
U.S. Appl. No. 14/218,408, filed Mar. 18, 2014, Response to Non-Final Office Action dated Apr. 11, 2016.
U.S. Appl. No. 14/218,408, filed Mar. 18, 2014, Non-Final Office Action dated Apr. 11, 2016.
U.S. Appl. No. 14/218,408, filed Mar. 18, 2014, Response to Final Office Action dated Jul. 27, 2015.
U.S. Appl. No. 14/218,408, filed Mar. 18, 2014, Final Office Action dated Jul. 27, 2015.
U.S. Appl. No. 14/218,408, filed Mar. 18, 2014, Response to Non-Final Office Action dated Feb. 12, 2015.
U.S. Appl. No. 14/218,408, filed Mar. 18, 2014, Non-Final Office Action dated Feb. 12, 2015.
U.S. Appl. No. 13/778,846, filed Feb. 27, 2013, Non-Final Office Action dated Jun. 5, 2017.
U.S. Appl. No. 13/778,846, filed Feb. 27, 2013, Response to Final Office Action dated Jul. 29, 2016.
U.S. Appl. No. 13/778,846, filed Feb. 27, 2013, Final Office Action dated Jul. 29, 2016.
U.S. Appl. No. 13/778,846, filed Feb. 27, 2013, Response to Non-Final Office Action dated Jan. 20, 2016.

(56) References Cited

OTHER PUBLICATIONS

U.S. Appl. No. 13/778,846, filed Feb. 27, 2013, Non-Final Office Action dated Jan. 20, 2016.
U.S. Appl. No. 14/034,055, filed Sep. 23, 2013, Examiner's Answer dated May 24, 2017.
U.S. Appl. No. 14/034,055, filed Sep. 23, 2013, Response to Non-Final Office Action dated Apr. 7, 2016.
U.S. Appl. No. 14/034,055, filed Sep. 23, 2013, Non-Final Office Action dated Apr. 7, 2016.
U.S. Appl. No. 14/034,055, filed Sep. 23, 2013, Response to Final Office Action dated Jan. 6, 2016.
U.S. Appl. No. 14/034,055, filed Sep. 23, 2013, Final Office Action dated Jan. 6, 2016.
U.S. Appl. No. 14/034,055, filed Sep. 23, 2013, Response to Non-Final Office Action dated Aug. 3, 2015.
U.S. Appl. No. 14/034,055, filed Sep. 23, 2013, Non-Final Office Action dated Aug. 3, 2015.
U.S. Appl. No. 14/493,970, filed Sep. 23, 2014, Response to Non-Final Office Action dated Jul. 29, 2016.
U.S. Appl. No. 14/493,970, filed Sep. 23, 2014, Non-Final Office Action dated Jul. 29, 2016.
U.S. Appl. No. 14/615,950, filed Feb. 6, 2015, Final Office Action dated Dec. 1, 2016.
U.S. Appl. No. 14/615,950, filed Feb. 6, 2015, Response to Non-Final Office Action dated May 26, 2016.
U.S. Appl. No. 14/615,950, filed Feb. 6, 2015, Non-Final Office Action dated May 26, 2016.
U.S. Appl. No. 14/615,950, filed Feb. 6, 2015, Response to Election/Restriction dated Feb. 10, 2016.
U.S. Appl. No. 14/615,950, filed Feb. 6, 2015, Restriction/Election dated Feb. 10, 2016.
U.S. Appl. No. 13/601,210, filed Aug. 31, 2012, Notice of Allowance dated Sep. 23, 2014.
U.S. Appl. No. 13/601,210, filed Aug. 31, 2012, Response to Final Office Action dated Jan. 2, 2014.
U.S. Appl. No. 13/601,210, filed Aug. 31, 2012, Final Office Action dated Jan. 2, 2014.
U.S. Appl. No. 13/601,210, filed Aug. 31, 2012, Response to Non-Final Office Action dated Aug. 1, 2013.
U.S. Appl. No. 13/601,210, filed Aug. 31, 2012, Non-Final Office Action dated Aug. 1, 2013.
U.S. Appl. No. 13/601,235, filed Aug. 31, 2012, Notice of Allowance dated Mar. 27, 2015.
U.S. Appl. No. 13/601,235, filed Aug. 31, 2012, Response to Non-Final Office Action dated Sep. 11, 2014.
U.S. Appl. No. 13/601,235, filed Aug. 31, 2012, Non-Final Office Action dated Sep. 11, 2014.
U.S. Appl. No. 13/601,267, filed Aug. 31, 2012, Notice of Allowance dated Jan. 21, 2014.
U.S. Appl. No. 13/601,267, filed Aug. 31, 2012, Response to Non-Final Office Action dated Aug. 14, 2013.
U.S. Appl. No. 13/601,267, filed Aug. 31, 2012, Non-Final Office Action dated Aug. 14, 2013.
U.S. Appl. No. 13/709,768, filed Dec. 10, 2012, Notice of Allowance dated Mar. 17, 2016.
U.S. Appl. No. 13/709,768, filed Dec. 10, 2012, Response to Final Office Action dated Oct. 23, 2015.
U.S. Appl. No. 13/709,768, filed Dec. 10, 2012, Final Office Action dated Oct. 23, 2015.
U.S. Appl. No. 13/709,768, filed Dec. 10, 2012, Response to Non-Final Office Action dated Apr. 21, 2015.
U.S. Appl. No. 13/709,768, filed Dec. 10, 2012, Non-Final Office Action dated Apr. 21, 2015.
U.S. Appl. No. 13/709,768, filed Dec. 10, 2012, Response to Non-Final Office Action dated Oct. 3, 2014.
U.S. Appl. No. 15/792,217, filed Oct. 24, 2017, Response to Non-Final Office Action dated Apr. 18, 2018 filed Jul. 16, 2018.
U.S. Appl. No. 14/034,055, filed Sep. 23, 2013, Notice of Allowance dated Sep. 14, 2018.
U.S. Appl. No. 14/493,970, filed Sep. 23, 2014, Non-Final Office Action dated Sep. 21, 2018.
U.S. Appl. No. 15/665,668, filed Aug. 1, 2017, Non-Final Office Action dated Sep. 7, 2018.
U.S. Appl. No. 15/164,070, filed May 25, 2016, Final Office Action dated Aug. 16, 2018.
U.S. Appl. No. 15/792,217, filed Oct. 24, 2017, Final Office Action dated Sep. 28, 2018.
U.S. Appl. No. 15/792,217, filed Oct. 24, 2017, Final Office Action dated May 15, 2019.
U.S. Appl. No. 14/493,970, filed Sep. 23, 2014, Final office Action dated Apr. 10, 2019.
U.S. Appl. No. 13/778,846, filed Feb. 27, 2013, Notice of Allowance dated May 15, 2019.
Anonymous, Swivel by FaceCake, the World's First 3D Virtual Dressing Room Showcased at Computex Taipei 2012, Jul. 12, 2012, Business Wire, 0EIN, p. 1. (Year: 2012).
European Patent Application 18194915.7 filed on Aug. 30, 2013, Office Action dated Nov. 7, 2019.
Kim et al., Inter-Device Media Synchronization in Multi-screen environment; Google: "http://www.w3.org/2013/10/tv-workshop/papers/webtv4_submission_26_pdf;" 2013; 3 paQes.
U.S. Appl. No. 15/898,103, filed Feb. 15, 2018, Non-Final Office Action dated Sep. 18, 2019.
U.S. Appl. No. 15/164,070, filed May 25, 2016, Notice of Allowance dated Oct. 18, 2019.
U.S. Appl. No. 15/665,668, filed Aug. 1, 2017, Non-Final Office Action dated Jan. 21, 2020.
U.S. Appl. No. 15/898,103, filed Feb. 15, 2018, Final Office Action dated Feb. 12, 2020.

* cited by examiner

PROVIDING SOUNDTRACK INFORMATION DURING PLAYBACK OF VIDEO CONTENT

BACKGROUND

Video content, such as movies and television programs, often features songs and other music as a soundtrack. While some music may be familiar to listeners, other music may be new or unfamiliar. In some cases, the listener may be acquainted with the music, yet the listener may not know the title, artist, or other identifying information. A listener may manually search a database of lyrics to discover identifying information for the music.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to providing information about a soundtrack during the playback of video content, such as a movie, a television program, or other video content. Users who are viewing video content may be interested in the soundtrack of the video content contemporaneously with the playback of a particular song or other music in the soundtrack. Users may immediately want to know the title, artist, album, and/or other information regarding a currently playing song.

As an example, a user may pause the playback of the video content and then manually execute a search for lyrics of the song within a lyrics database. Alternatively, the user may quickly write down the lyrics in order to perform a search later. As another example, a user may grab a smartphone and use an application to perform recognition on the currently playing song. In both examples, the playback experience is interrupted because the user has to move quickly to perform some action (e.g., write down the lyrics, search for the lyrics, recognize the music with a smartphone, etc.) before the song ends or the user forgets the lyrics.

Various embodiments of the present disclosure facilitate display of soundtrack information during playback responsive to a command, e.g., a voice command, a physical gesture, a selection of a remote control button, and so on. Consequently, title, artist, and/or other information may be rendered upon the display while the video content is playing. Various options may be provided for a user to purchase the audio track, add the audio track to a wishlist or other list for later review and/or purchase, share the audio track in a social network, indicate interest or disinterest regarding the audio track in a social network, preview the audio track, and/or perform other actions relative to the audio track. In one embodiment, a user may select an option to cause more information about the audio track to be rendered upon a second screen.

Figure 1:
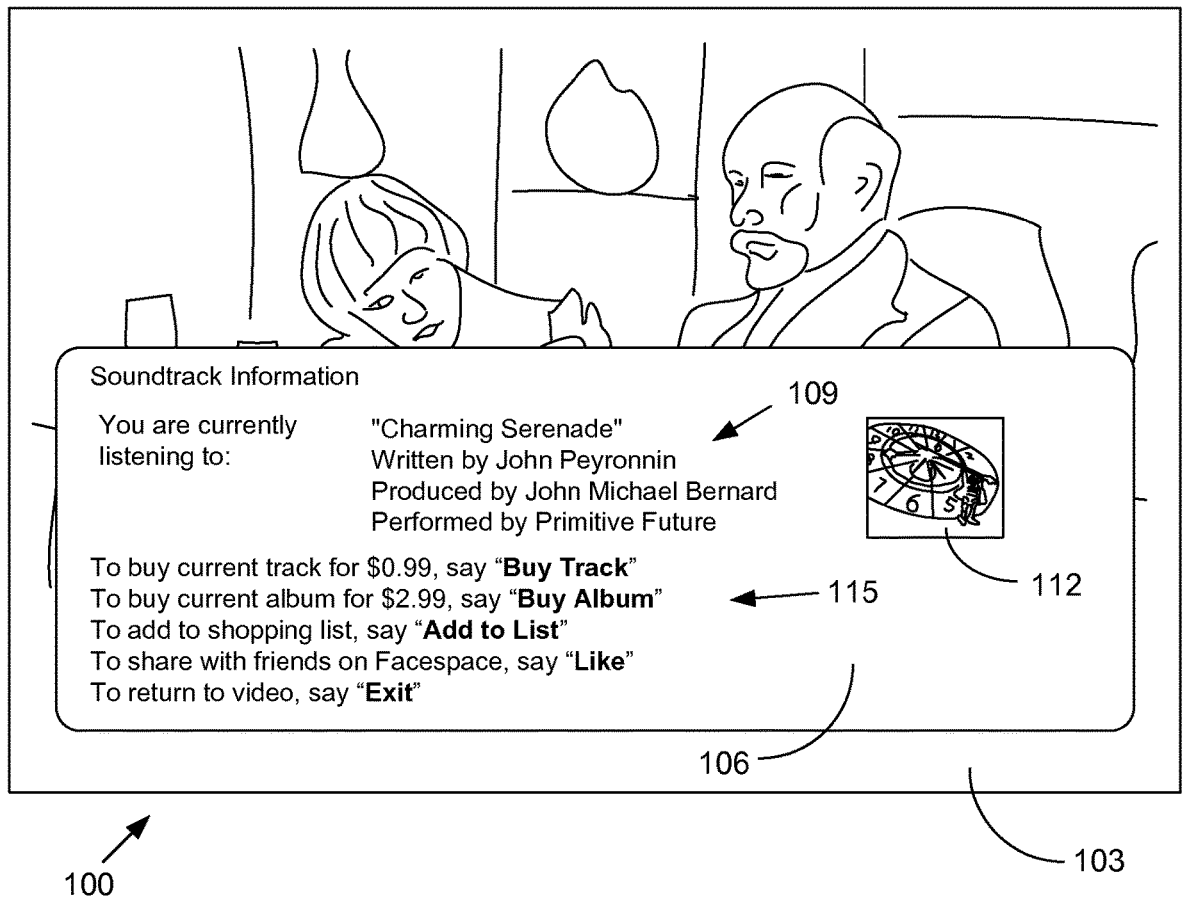
FIG. 1 is a drawing of an example of an audio information user interface and a video content item rendered by a display according to various embodiments of the present disclosure.

With reference to FIG. 1, shown is one example of a display 100 that shows a video content item 103 according to one embodiment. In this example, the video content item 103 corresponds to a movie, and the user has issued a command requesting information regarding the current audio in the movie. The command may correspond to a voice command (e.g., "show audio info"), a physical gesture (e.g., waving of a hand back and forth), a button press via a remote control, or some other command. In response to the command, an audio information user interface 106 is rendered upon the display 100. In this example, the audio information user interface 106 obscures a portion of the video content item 103. In one scenario, the video content item 103 may be paused while the audio information user interface 106 is rendered. In another scenario, the playback of the video content item 103 may continue while the audio information user interface 106 is rendered. In the example of FIG. 1, the audio information user interface 106 obscures a portion of the video content item 103 on the display 100. In other examples, the audio information user interface 106 may obscure the entirety of the video content item 103 on the display 100, or the audio information user interface 106 may be rendered on a different display 100.

The audio information user interface 106 provides various information 109 regarding the current audio of the video content item 103. Such information 109 may include title, artist, album name, composer, producer, publishing company, year released, genre, and other information. In this case, the current audio for the video content item 103 has a title of "Charming Serenade," was composed by "John Peyronnin," was produced by "John Michael Bernard," and was performed by the artist "Primitive Future." One or more representative images 112 (e.g., album cover art, artist photos, performer headshots, etc.) may be shown within the audio information user interface 106. In other examples, the audio information user interface 106 may recommend other audio tracks that the user might like, present information regarding other audio tracks by the same artist, indicate which of the user's friends in a social network have already "liked" the current audio track, include crowd-based ratings of the audio track and components to submit such ratings, and so on.

Various techniques relating to providing extrinsic data in connection with video content are described in U.S. patent application Ser. No. 13/601,267 filed on Aug. 31, 2012 entitled "ENHANCING VIDEO CONTENT WITH EXTRINSIC DATA," U.S. patent application Ser. No. 13/601,235 filed on Aug. 31, 2012 entitled "TIMELINE INTERFACE FOR VIDEO CONTENT," U.S. patent application Ser. No. 13/601,210 filed on Aug. 31, 2012 entitled "PROVIDING EXTRINSIC DATA FOR VIDEO CONTENT," all of which are incorporated by reference herein in their entirety.

The audio information user interface 106 may include a listing 115 corresponding to commands that may be issued relative to the current audio item. Such commands may be voice commands, physical gestures, tracked eye movements, button presses via a remote control, user interface buttons for use with a mouse, keyboard, or other input device, and/or other types of commands. By way of the commands indicated in the listing 115, a user may purchase the audio item, purchase an album that contains the item, add the audio item to a list for later review, share an indication of interest or disinterest regarding the audio item with a social network, exit the audio information user interface 106, and/or perform other actions.

In the non-limiting example of FIG. 1, the commands are voice commands of "buy track," "buy album," "add to list," "like," and "exit." The listing 115 may include prices associated with the respective commands and actions, e.g., $0.99 to buy a track, $2.99 to buy an album, and so on. In other examples, a more basic audio information user interface 106 (e.g., a graphical icon) may be presented automatically while the video content item 103 is playing merely to notify the user that additional information regarding the current audio is available. In the following discussion, a general description of the system and its components is provided, followed by a discussion of the operation of the same.

Figure 2:
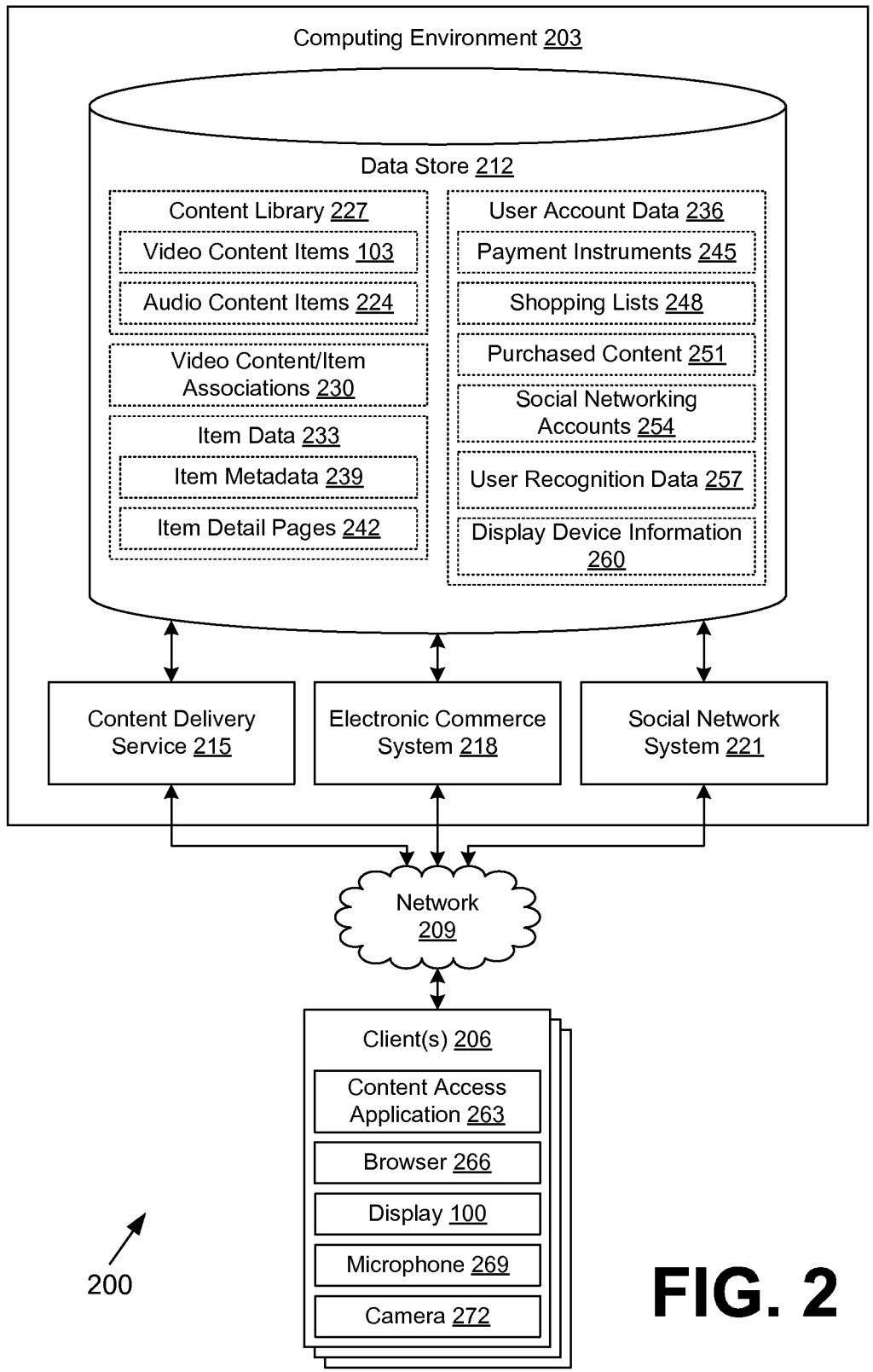
FIG. 2 is a drawing of a networked environment according to various embodiments of the present disclosure.

Referring next to FIG. 2, shown is a networked environment 200 according to various embodiments. The networked environment 200 includes a computing environment 203 and one or more clients 206 in data communication via a network 209. The network 209 includes, for example, the Internet, intranets, extranets, wide area networks (WANs), local area networks (LANs), wired networks, wireless networks, or other suitable networks, etc., or any combination of two or more such networks.

The computing environment 203 may comprise, for example, a server computer or any other system providing computing capability. Alternatively, the computing environment 203 may employ a plurality of computing devices that are arranged, for example, in one or more server banks or computer banks or other arrangements. Such computing devices may be located in a single installation or may be distributed among many different geographical locations. For example, the computing environment 203 may include a plurality of computing devices that together may comprise a cloud computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a content delivery service 215, an electronic commerce system 218, a social network system 221, and other applications, services, processes, systems, engines, or functionality not discussed in detail herein. Although the content delivery service 215, the electronic commerce system 218, and the social network system 221 are shown within a single computing environment 203, it is understood that these systems may be implemented within multiple computing environments 203 operated by different entities in some embodiments.

The content delivery service 215 is executed to serve up video content items 103, audio content items 224 and/or other content from a content library 227 in the data store 212. The content delivery service 215 may be configured to stream or otherwise send the content to the clients 206 by way of the network 209. In addition, the content delivery service 215 may serve up other data to facilitate rendering of an audio information user interface 106 (FIG. 1) by the clients 206. The content delivery service 215 may correspond to a video-on-demand service, a cable or satellite head-end, television broadcasting service, or other content provider.

The electronic commerce system 218 is executed in order to facilitate the online purchase of items such as video content items 103, audio content items 224, and other items over the network 209. The electronic commerce system 218 also performs various backend functions associated with the online presence of a seller in order to facilitate the online purchase of items. For example, the electronic commerce system 218 may generate network pages or portions thereof that are provided to clients 206 for the purposes of selecting items for purchase, rental, download, lease, or other forms of consumption. As used herein, the term "item" may encompass products, goods, services, video files and streams, audio files and streams, downloads, and/or other items.

The social network system 221 is executed to perform functionality relating to maintaining a social network, where users share information with their circles of friends. For example, a user may share an item (e.g., an image file) via a social network, and other users in the user's circle of friends may then have access to the item via a news feed, message, or other form of social network communication. In some cases, a user may share an indication of interest or disinterest in a particular item. To this end, users may indicate that they "like" a certain item or "dislike" another item, and this information may be made available to others in the user's circle of friends. Various social network actions may include sharing an item, indicating interest in an item, indicating disinterest in an item, posting a message on a profile, posting a message via a news feed, sending a message directly to one or more other users, suggesting that other users "like" or "dislike" a certain item, and/or other actions.

The data stored in the data store 212 includes, for example, a content library 227, video content/item associations 230, item data 233, user account data 236, and potentially other data. The content library 227 may include various forms of content that may be delivered to a client 206 by the content delivery service 215, which may include video content items 103 such as movies, television programs, video clips, and so on; audio content items 224 such as songs and other music, audio books, audio programs, and so on; and other forms of content. Users may have limited or unlimited access to content in the content library 227 according to a number of different licensing arrangements. For example, a user may purchase a subscription for unlimited access to a certain type of content, and then be able to purchase other types of content a la carte. Access to particular content in the content library 227 may be unlimited, time limited, or access quantity limited. In some embodiments, content access for a user may be limited to a predefined number of clients 206 associated with the user.

The video content/item associations 230 correlate times within the video content items 103 with other items, such as audio content items 224, products featured during the content, services related to the content, and other items. For example, the video content/item associations 230 may indicate that at 45 minutes, 20 seconds into a particular movie, a particular song begins to play. In one embodiment, the video content/item associations 230 may be scene-correlated. For example, the video content/item associations 230 may indicate that a particular song is played within the fifth scene of a movie. The fifth scene may, for example, correspond to the time in the movie beginning at seven minutes, fifteen seconds and continuing through ten minutes, three seconds, and the particular song may be played during a portion of any of that time.

The video content/item associations 230 may be pre-existing in the data store 212 or generated on demand. In one embodiment, the video content/item associations 230 are manually curated data. In another embodiment, the video content/item associations 230 may be crowd sourced. In still another embodiment, the video content/item associations 230 may be automatically generated by way of image or audio recognition techniques via a comparison with an audio fingerprint, image fingerprint, and so on. Various techniques relating to mapping extrinsic data with video content are described in U.S. patent application Ser. No. 13/227,097 entitled "SYNCHRONIZING VIDEO CONTENT WITH EXTRINSIC DATA" and filed on Sep. 7, 2011, which is incorporated herein by reference in its entirety.

The item data 233 describes items that are featured in connection with portions of the video content items 103. Such items may be audio content items 224, e.g., a sound track that plays during a portion of a particular video content item 103, or other items. For example, a scene in a video content item 103 may feature placement of a specific product, and the specific product may be offered for sale via the electronic commerce system 218. In another example, a certain service may be judged relevant to a particular portion of a video content item 103 for advertising purposes.

The item data 233 may include item metadata 239, item detail pages 242, and/or other data. The item metadata 239 may include various information about the item, such as title, description, artist, album, composer, genre, category, year released, length, price, and/or other information as applicable to the type of item. The item metadata 239 may be employed in rendering the audio information user interface 106. The item detail pages 242 may correspond to network pages, such as web page, mobile application data, or other forms of network content, that provide detailed information regarding an item. To this end, the item detail pages 242 may include descriptions, image galleries, audio samples, and/or other additional information beyond that of the item metadata 239. The item data 233 may also include three-dimensional representations of items and reviews and ratings of items.

The user account data 236 includes data relating to user accounts with the content delivery service 215, the electronic commerce system 218, and/or the social network system 221. A user may have a single account shared among two or more of these systems or separate accounts. The user account data 236 may include, for example, payment instruments 245, shopping lists 248, purchased content 251, social networking accounts 254, user recognition data 257, display device information 260, and/or other data. The payment instruments 245 may include credit cards, debit cards, bank accounts, and/or other forms of payment that may be linked to a user account. The shopping lists 248 may include wish lists, watch lists, electronic shopping carts, electronic gift registries, and/or other lists of items.

The purchased content 251 includes content (such as video content items 103, audio content items 224, etc.) for which a right has been acquired by the user. Such a right may correspond to a rental, an unrestricted purchase, a purchase for a limited number of downloads, views, plays, or other forms of consumption, etc. Such rights may be limited to consumption by certain ones of the clients 206 or at most a predefined number of the clients 206 in some embodiments. In various embodiments, the purchased content 251 is stored in a virtual file system hosted on behalf of the user by a remote storage system for future consumption by the user. In one scenario, the remote storage system may employ data deduplication such that one copy of a content file may be shared among multiple file systems corresponding to different users.

Different versions of the content may be maintained in the purchased content 251, as appropriate for the different types of clients 206 that may access the content. For example, a lower resolution version of a video content item 103 may be maintained in the purchased content 251 for access by a client 206 that is a smartphone, while a higher resolution version of the video content item 103 may be maintained for access by a client 206 that is a large screen digital television coupled to the network 209 via a high speed broadband connection.

The social networking accounts 254 may include information relevant to one or more accounts of the users with social network systems 221. Such information may include login information, circles of friends, privacy settings, messaging settings, and/or other settings and preferences. The user recognition data 257 facilitates recognition of a user's voice, face or other physical appearance, or other characteristics. For example, the user recognition data 257 may permit distinguishing among multiple different users within a room to determine which user issued a voice command.

The display device information 260 may include data describing multiple displays 100 and potentially multiple clients 206 that may be used in presenting information to the user. For example, while a first display 100 renders a video content item 103, a second display 100 may be employed to render additional information relevant to the video content item 103, such as, for example, the audio information user interface 106 or item detail pages 242. Various techniques relating to using multiple display devices to provide content are described in U.S. patent application Ser. No. 13/709,768 entitled "PROVIDING CONTENT VIA MULTIPLE DISPLAY DEVICES" and filed on Dec. 10, 2012, which is incorporated herein by reference in its entirety.

The client 206 is representative of a plurality of client devices that may be coupled to the network 209. The client 206 may comprise, for example, a processor-based system such as a computer system. Such a computer system may be embodied in the form of a desktop computer, a laptop computer, personal digital assistants, cellular telephones, smartphones, smart goggles, set-top boxes, music players, web pads, tablet computer systems, game consoles, electronic book readers, or other devices with like capability. The client 206 may include one or more displays 100. The display 100 may comprise, for example, one or more devices such as liquid crystal display (LCD) displays, gas plasma-based flat panel displays, organic light emitting diode (OLED) displays, electrophoretic ink (E Ink) displays, LCD projectors, or other types of display devices, etc.

The client 206 may be configured to execute various applications such as a content access application 263, a browser 266, and/or other applications. The content access application 263 is executed to obtain video content items 103 from the content delivery service 215 via the network 209, and to render the video upon the display 100. In addition, the content access application 263 may accept various commands and render an audio information user interface 106 among other supplemental user interfaces. The content access application 263 may accept voice commands by way of a microphone 269 and/or physical gesture commands by way of a camera 272.

The browser 266 may be executed in a client 206, for example, to access network content served up by the computing environment 203 and/or other servers, thereby rendering a user interface on the display 100. The client 206 may be configured to execute applications beyond the content access application 263 and the browser 266 such as, for example, browsers, mobile applications, email applications, social networking applications, and/or other applications. In other examples, one client 206 associated with the user may include the content delivery service 215, while another client 206 associated with the user may include the browser 266 or another supplemental content access application.

Next, a general description of the operation of the various components of the networked environment 200 is provided. To begin, a user selects and commences playback of a video content item 103 using the content access application 263 in a client 206. In one embodiment, the content access application 263 downloads or streams the video content item 103 from the content delivery service 215 by way of the network 209. In another embodiment, the content access application 263 renders a previously downloaded or obtained video content item 103. The content access application 263 renders the video content item 103 upon the display 100 of the client 206.

While the video content item 103 is being played back, the user may issue a command for additional information about a featured item. In one example, the featured item may be the current audio being played back as the soundtrack of the video content item 103. In another example, the featured item may be a product visible within the video of the video content item 103. In yet another example, the featured item may be a product that is related or relevant to the current video or audio of the video content item 103. To this end, the user may speak a voice command that is captured via the microphone 269 (e.g., "show soundtrack info"), perform a gesture that is captured via the camera 272 (e.g., raise a hand and wave from side to side), select a button on a remote, press a predefined key on a keyboard of the client 206, swipe a finger across a touchscreen display 100 of the client 206, or issue a command via another approach.

The current time or scene in the video content item 103 may be determined in order to identify the featured item or audio content item 224 for which the information is to be shown. The content delivery service 215 and/or the content access application 263 may correlate the current time/scene with the featured item using the video content/item associations 230. In one embodiment, the content delivery service 215 or the content access application 263 may automatically recognize an audio content item 224 occurring in the soundtrack of the video content item 103 based at least in part on an audio fingerprint associated with the audio content item 224.

Consequently, a user interface such as the audio information user interface 106 may be rendered upon the display 100 or another display 100. In one embodiment, the user interface may obscure at least a portion of the playback of the video content item 103 on the display 100. In another embodiment, the video content item 103 may be resized and the user interface may not obscure the playback of the video content item 103 on the display 100. The playback of the video content item 103 may continue or may be paused.

The user interface may provide various information regarding the item, including, for example, title, artist, album name, cover art, artist image, item image, year released, genre, category, price, run length, and/or other information. In one embodiment, the user interface may be at least partially audio-based, with at least some of the information regarding the item being provided as audio content that is mixed with or replaces corresponding audio content of the video content item 103. For example, the content access application 263 may verbally announce the title and artist for the current audio track.

In some embodiments, the user commands may be sent from the client 206 back to the content delivery service 215 for processing. The content delivery service 215 may embed the information user interface within the video being streamed to the client 206. Alternatively, the content delivery service 215 may send directives to the content access application 263 to render the information user interface. In other embodiments, the user commands may be processed by the client 206 and the information user interface may be rendered by the client 206. In some cases, the content access application 263 may request item metadata 239 for the featured item from the content delivery service 215 before rendering the information in the information user interface.

In addition to providing information regarding the featured item, the user interface may include various user interface components (e.g., text labels, buttons, etc.) to facilitate purchasing the featured item via the electronic commerce system 218 using a preconfigured payment instrument 245, adding the featured item to a shopping list 248, adding the featured item to a music library, queuing the featured item to a playlist or watch list, obtaining still further information about the featured item, share the featured item via a social network system 221, and/or performing other actions relative to the featured item. The user may be recognized in the content access application 263 and/or the content delivery service 215 by way of the user recognition data 257, and consequently, the actions may be relative to a particular user account. The user interface may provide various instructions to the user as to how to perform the actions, such as, for example, "say 'buy now' to purchase this audio track," "swipe left to add this item to your shopping list," "say 'like' to share with your friends," and so on. Such commands may be valid at times when the information user interface is shown as well as at times when the information user interface is hidden. Where multiple items are featured items, the user interface may facilitate a user selection from among the multiple items.

In one embodiment, when a user issues a command for further information, the additional information may be shown on another display 100. For example, a user may be watching a movie on a digital television, and an item detail page 242 may be retrieved and shown by a browser 266 on a tablet. To this end, the user may perform a registration process with each of multiple clients 206 and the content delivery service 215 so that the content delivery service 215 knows to instruct another secondary client 206 to display the item detail page 242.

In some cases, the secondary client 206 may be employed to complete a requested action. For instance, a user may input a password, a credit card number, etc. by way of a user interface on a smartphone in order to complete a purchase action. As an alternative, the client 206 may be automatically configured to show a shopping list 248 when the video content item 103 has finished so as to allow the user to review items in which the user was interested while the video content item 103 was playing.

In one scenario, a video content item 103 may be watched by multiple users having different user accounts. A group of friends may be watching a movie on a digital television.

Suppose that each of the friends has a separate user account. One of the friends may speak a voice command to trigger soundtrack information to be displayed. The content access application 263 and/or the content delivery service 215 may recognize the user with the user recognition data 257 on the basis of the user's voice or face. Alternatively, a user may use a contactless card or other identification device to be recognized by way of a near-field communication (NFC) enabled device, barcode scanner, or other device. The soundtrack information may then be rendered upon the shared digital television, a secondary display 100, or a display 100 on a client 206 associated with the particular recognized user (e.g., the user's smartphone). The user may then choose to perform an action, and the action will be performed relative to the user's own account.

Figure 3:
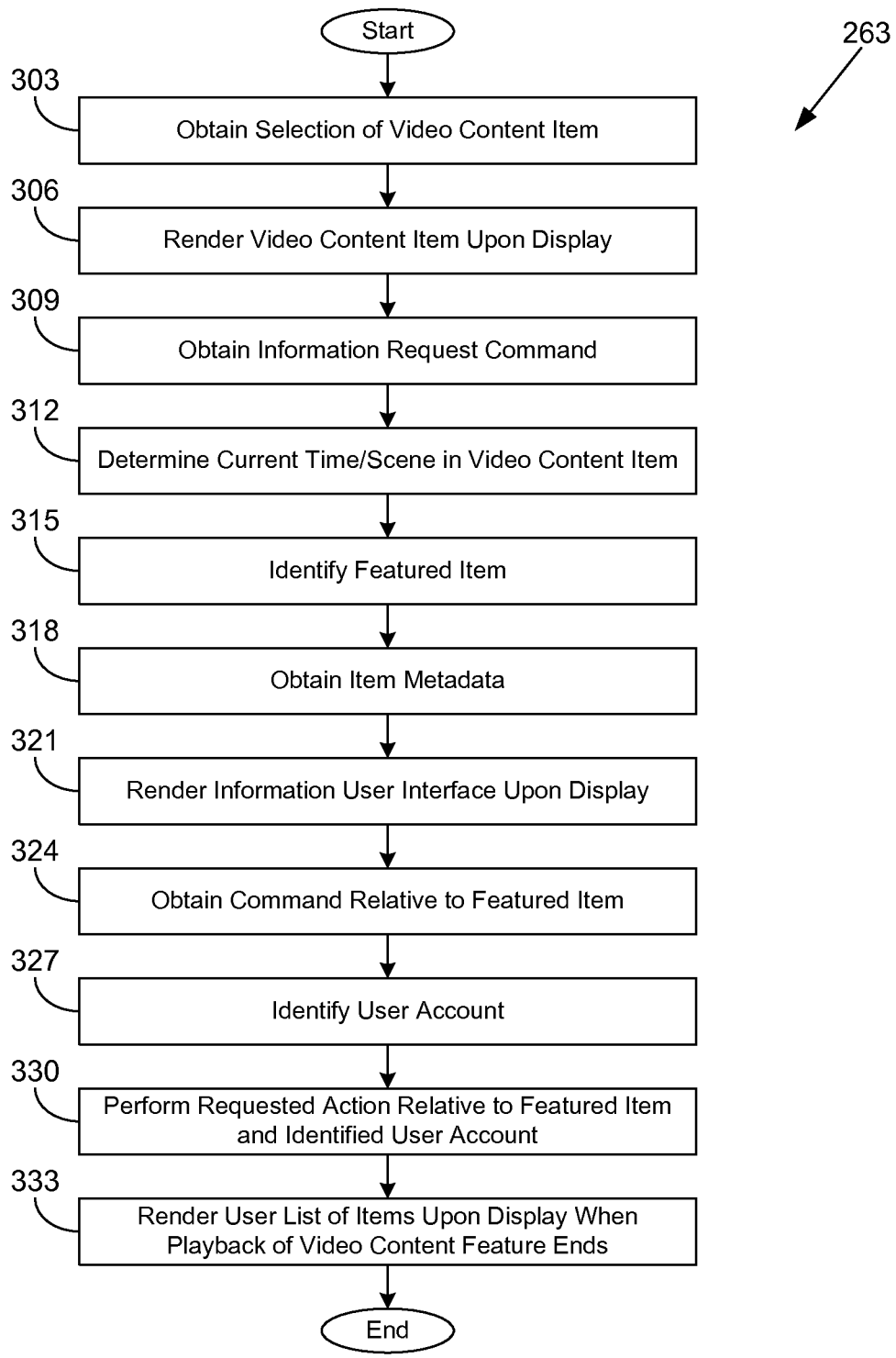
FIG. 3 is a flowchart illustrating one example of functionality implemented as portions of a content access application executed in a client in the networked environment of FIG. 2 according to various embodiments of the present disclosure.

Turning now to FIG. 3, shown is a flowchart that provides one example of the operation of a portion of the content access application 263 according to various embodiments. It is understood that the flowchart of FIG. 3 provides merely an example of the many different types of functional arrangements that may be employed to implement the operation of the portion of the content access application 263 as described herein. As an alternative, the flowchart of FIG. 3 may be viewed as depicting an example of steps of a method implemented in the client 206 (FIG. 2) according to one or more embodiments. In various embodiments, some of the functionality discussed below may be performed by the content delivery service 215 (FIG. 2) executed in the computing environment 203 (FIG. 2).

Beginning with box 303, the content access application 263 obtains a selection of a video content item 103 (FIG. 1). In box 306, the content access application 263 begins playback of the video content item 103, rendering the video content item 103 upon the display 100 (FIG. 1) of the client 206. To this end, the content access application 263 may read the video content item 103 from a local data store, or the content access application 263 may stream the video content item 103 from the content delivery service 215 via the network 209 (FIG. 2). While the video content item 103 is being played back, the content access application 263 obtains an information request command in box 309. For example, a user may say "request soundtrack info," perform a physical gesture, or perform some other action corresponding to the information request command.

In response to the information request command, in box 312, the content access application 263 determines the current time or scene in the playback of the video content item 103. In box 315, the content access application 263 identifies the featured item (e.g., a current audio content item 224 (FIG. 2), a product shown in the scene, a product relevant to the scene, etc.) based at least in part on the video content/item associations 230. In box 318, the content access application 263 obtains the item metadata 239 (FIG. 2) corresponding to the identified item from the data store 212 (FIG. 2). In box 321, the content access application 263 renders an information user interface, such as the audio information user interface 106 (FIG. 1), upon the display 100.

In box 324, the content access application 263 obtains a command relative to the featured item. For example, such a command may involve purchasing the featured item, adding the featured item to a user list such as a shopping list 248 (FIG. 2), sharing an indication of interest or disinterest, requesting additional information regarding the featured item, and so on. In box 327, the content access application 263 identifies the user account associated with the user who issued the command. For example, the content access application 263 may employ voice recognition of a voice command along with the user recognition data 257 (FIG. 2) to identify the user account. In other examples, the user account may be identified based upon an association between the user account and the particular client 206.

In box 330, the content access application 263 performs the requested action relative to the featured item and the identified user account. As a non-limiting example, where the user issues a "like" command, the content access application 263 may share the indication of "like" regarding the item with a circle of friends identified by a corresponding social networking account 254 (FIG. 2) with a social network system 221. As another non-limiting example, where the user issues a "view detailed information" command, the content access application 263 may send a directive to another client 206 identified by the display device information 260 (FIG. 2) to render an item detail page 242 (FIG. 2) for the featured item.

In box 333, when the playback of the video content feature 103 ends, the content access application 263 may render a user list of items upon a display 100. Thus, the user may peruse a list of items determined during the playback of the video content feature 103 for possible purchase or other consumption without unduly interrupting the playback of the video content feature 103. The user may then elect to purchase the item via the electronic commerce system 218. In other examples, a user may have an unlimited subscription to the items and may choose to add the item to a playlist or watch list. Thereafter, the portion of the content access application 263 ends.

Figure 4:
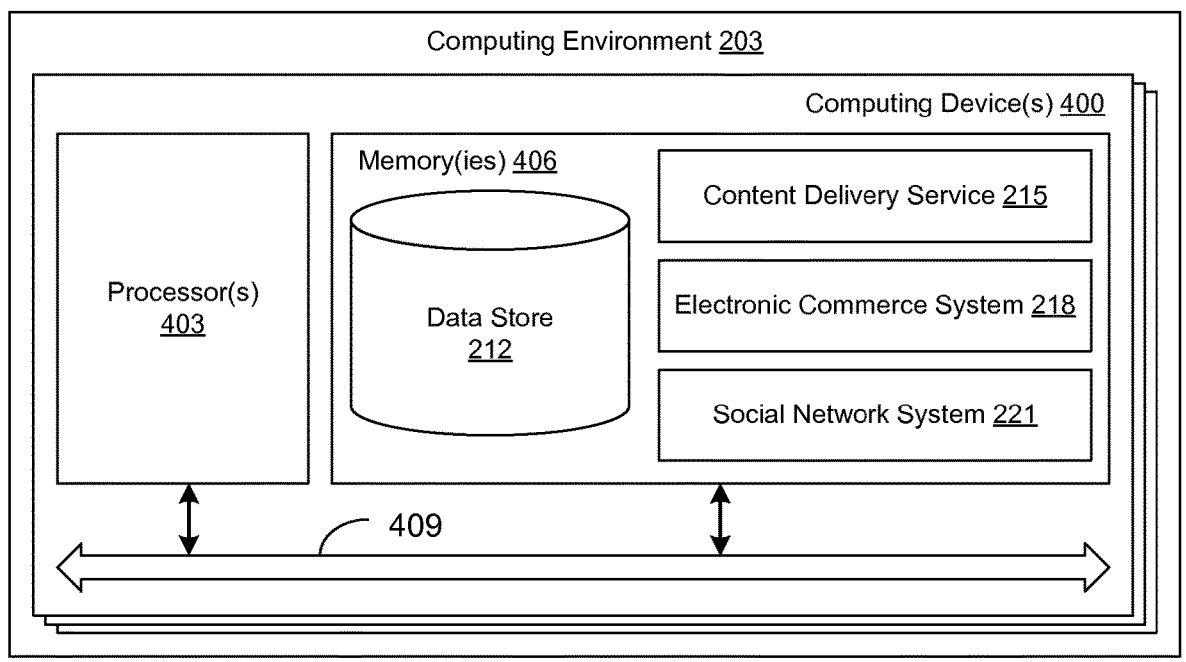
FIG. 4 is a schematic block diagram that provides one example illustration of a computing environment employed in the networked environment of FIG. 2 according to various embodiments of the present disclosure.

With reference to FIG. 4, shown is a schematic block diagram of the computing environment 203 according to an embodiment of the present disclosure. The computing environment 203 includes one or more computing devices 400. Each computing device 400 includes at least one processor circuit, for example, having a processor 403 and a memory 406, both of which are coupled to a local interface 409. To this end, each computing device 400 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the content delivery service 215, the electronic commerce system 218, the social network system 221, and potentially other applications. Also stored in the memory 406 may be a data store 212 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and/or multiple processor cores and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the content delivery service 215, the electronic commerce system 218, the social network system 221, the content access application 263 (FIG. 2), the browser 266 (FIG. 2), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 3 shows the functionality and operation of an implementation of portions of the content access application 263. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the content delivery service 215, the electronic commerce system 218, the social network system 221, the content access application 263, and the browser 266, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications Therefore, the following is claimed:

1. A system, comprising:
a first display;
a computing device; and
an application executable in the computing device, wherein when executed the application causes the computing device to at least:
render a video content item upon the first display, the video content item including video content and corresponding audio content;
identify, based at least in part on at least one of: gesture recognition or voice recognition, a user-initiated audio information command for the video content item, the user-initiated audio information command being initiated by a particular user;
determine the particular user based at least in part on the user-initiated audio information command;
determine a current time in playback of the video content item based at least in part on the user-initiated audio information command;
identify an audio content item associated with the current time in the playback of the video content item;
identify a client device, wherein the particular user is associated with the client device and the computing device based at least in part on a registration process;
render an audio information user interface upon a second display of the client device, the audio information user interface providing information regarding the audio content item while the video content item is rendered upon the first display and additional information regarding the audio content item is provided during the playback as audio content mixed with audio of the video content item, wherein the audio information user interface comprises a listing of commands relative to the audio content item, the listing of commands including a description of how to state a voice command that issues a particular command from the listing of commands, wherein the additional information regarding the audio content item comprises an audio clip of the audio content item; and
perform the particular command based at least in part on audio recognition of the voice command that corresponds to the description.

2. The system of claim 1, wherein when executed the application further causes the computing device to at least:
obtain a user selection of a component of the audio information user interface that initiates a purchase of the audio content item; and
initiate the purchase of the audio content item responsive to the user selection of the component.

3. The system of claim 1, wherein when executed the application further causes the computing device to at least:
obtain a user selection of a component of the audio information user interface that adds the audio content item to a user-associated list; and
add the audio content item to the user-associated list responsive to the user selection of the component.

4. The system of claim 3, wherein the user selection corresponds to at least one of: a subsequent voice command, a command initiated by way of a remote control, or a physical gesture captured by a camera.

5. The system of claim 1, wherein when executed the application further causes the computing device to at least:
obtain a user selection of a component of the audio information user interface that causes additional information regarding the audio content item to be rendered upon the second display; and
cause the additional information regarding the audio content item to be rendered upon the second display responsive to the user selection of the component.

6. The system of claim 5, wherein when executed the application further causes the computing device to at least instruct the client device, responsive to the user selection of the component, to obtain the additional information regarding the audio content item and to render the additional information upon the second display.

7. The system of claim 1, wherein when executed the application further causes the computing device to at least determine a particular user account based at least in part on the voice command and user recognition data in order to determine the particular user.

8. The system of claim 1, wherein at least one other user-initiated audio information command comprises a command initiated by way of a remote control.

9. The system of claim 1, wherein at least one other user-initiated audio information command comprises a physical gesture captured by a camera.

10. A method, comprising:
rendering, by a computing device, a video content item upon a first display, the video content item including video content and corresponding audio content;
obtaining, by the computing device, a user-initiated command; and
responsive to the computing device obtaining the user-initiated command:
identifying, by the computing device, one of a plurality of users based at least in part on the user-initiated command;
determining, by the computing device, a current time in playback of the video content item;
identifying, by the computing device, an item associated with the current time in the playback of the video content item, the item being featured within at least one of: the video content or the audio content corresponding to the current time; and
rendering, by a client device, an information user interface upon a second display of the client device, the information user interface providing information regarding the item while the video content item is rendered upon the first display and additional information regarding the item is provided during the playback as audio content mixed with audio of the video content item, the information user interface comprising a listing of commands that includes a description of how to state a voice command that issues a particular command, wherein the additional information regarding the item comprises an audio clip of an audio content item associated with the item; and
performing the particular command based at least in part on audio recognition of the voice command that corresponds to the description.

11. The method of claim 10, further comprising initiating, by the computing device, a purchase of the item in response to the user-initiated command.

12. The method of claim 10, wherein the item is a product related to a scene of the video content item corresponding to the current time.

13. The method of claim 10, wherein the playback of the video content item continues on the first display while the information user interface is rendered upon the second display.

14. The method of claim 10, further comprising:
obtaining, by the computing device, the voice command;
responsive to obtaining the voice command, adding, by the computing device, the item to a user list; and
rendering, by the computing device, the user list upon the second display.

15. The method of claim 10, further comprising:
obtaining, by the computing device, the voice command;
identifying, by the computing device, the one of the plurality of users based at least in part on the voice command; and
initiating, by the computing device, a purchase of the item via a user account associated with the one of the plurality of users, wherein upon consummation of the purchase, the item becomes accessible to the one of the plurality of users via a remote storage system associated with the user account.

16. The method of claim 10, further comprising:
obtaining, by the computing device, the voice command;
identifying, by the computing device, the one of the plurality of users based at least in part on the voice command; and
performing, by the computing device, a social network action relative to the item by way of a social network account associated with the one of the plurality of users.

17. The method of claim 10, further comprising:
obtaining, by the computing device, a subsequent voice command; and
instructing, by the computing device, the client device to render a network page with additional information regarding the item in response to the subsequent voice command.

18. A non-transitory computer-readable medium embodying a program executable in a computing device, wherein when executed by the computing device, the program causes the computing device to at least:
render a video content item upon a first display, the video content item including video content and corresponding audio content;
identify, based at least in part on at least one of: gesture recognition or voice recognition, a user-initiated audio information command;
determine a current time in playback of the video content item;
identify an audio content item associated with the current time in the playback of the video content item;
render an audio information user interface upon a second display, the audio information user interface providing information regarding the audio content item while the video content item is rendered upon the first display and additional information regarding the audio content item is provided during the playback as audio content mixed with audio of the video content item, the audio information user interface comprising a listing of commands relative to the audio content item, the listing of commands including a description of how to state a voice command that issues a particular command from the listing of commands, wherein a particular user is associated with the first display and the second display, wherein the additional information regarding the audio content item comprises an audio clip of the audio content item; and
perform the particular command based at least in part on audio recognition of the voice command that corresponds to the description.

19. The non-transitory computer-readable medium of claim 18, wherein the audio information user interface partially obscures the video content item, the audio content item is currently featured in a soundtrack of the video content item when the user-initiated audio information command is obtained from a first user, and playback of the video content item continues while the audio information user interface is rendered, and wherein when executed, the program further causes the computing device to at least:
obtain an audio interest command from a second user;
identify a user account associated with the second user based at least in part on voice recognition of the second user; and
perform an action relative to the user account and the audio content item in response to the audio interest command, the action comprising at least one of: purchasing the audio content item by way of the user account, adding the audio content item to a shopping list associated with the user account, pushing additional information regarding the audio content item to a second client device associated with the user account, or sharing an indication of interest or disinterest in the audio content item via a social network with the user account.

20. The non-transitory computer-readable medium of claim 18, wherein the video content item is rendered upon the first display by a content access application, and wherein in response to a completion of the playback of the video content item, a user interface of the content access application renders a list of a plurality of audio content items identified during the playback of the video content item.

* * * * *